(12) United States Patent
Hayashi

(10) Patent No.: US 9,056,561 B2
(45) Date of Patent: Jun. 16, 2015

(54) SLIDE RAIL DEVICE FOR VEHICLE

(75) Inventor: Naoki Hayashi, Toyokawa (JP)

(73) Assignee: SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 13/993,345

(22) PCT Filed: Nov. 17, 2011

(86) PCT No.: PCT/JP2011/076537
§ 371 (c)(1),
(2), (4) Date: Jun. 12, 2013

(87) PCT Pub. No.: WO2012/081354
PCT Pub. Date: Jun. 21, 2012

(65) Prior Publication Data
US 2013/0256493 A1   Oct. 3, 2013

(30) Foreign Application Priority Data

Dec. 13, 2010   (JP) .................................. 2010-277515

(51) Int. Cl.
*F16M 13/00*   (2006.01)
*B60N 2/08*   (2006.01)
*B60N 2/07*   (2006.01)

(52) U.S. Cl.
CPC ................. *B60N 2/08* (2013.01); *B60N 2/0881* (2013.01); *B60N 2/0705* (2013.01); *B60N 2/0715* (2013.01); *B60N 2/0818* (2013.01);
(Continued)

(58) Field of Classification Search
CPC ............................ B60N 2/0727; B60N 2/0881

USPC ............ 248/424, 429, 430; 384/7, 10, 26, 34, 384/38, 49, 50, 53, 55; 297/344.1, 344.11; 296/65.13

See application file for complete search history.

(56) References Cited

U.S. PATENT DOCUMENTS 3,479,099 A * 11/1969 Krause ............................ 384/34
4,109,973 A *  8/1978 Terada ............................ 384/57
5,046,698 A *  9/1991 Venier ........................... 248/430

(Continued)

FOREIGN PATENT DOCUMENTS

JP   2005-238929 A   9/2005
JP   2008-265695 A   11/2008

OTHER PUBLICATIONS

International Search Report for PCT/JP2011/076537 (Dec. 12, 2011).

(Continued)

*Primary Examiner* — Terrell McKinnon
*Assistant Examiner* — Michael McDuffie
(74) *Attorney, Agent, or Firm* — Millen, White, Zelano & Branigan, P.C.

(57) ABSTRACT

A slide rail device for a vehicle is provided, which can increase the rotatable range of a handle that is connected to a lock operational lever, and the operational force that is necessary for carrying out a lock release operation can be reduced, even if the rotatable range of the lock operational lever is limited to a narrow range by an upper rail.

The slide rail device includes a biaser 70 which rotatably biases the handle with respect to said lock operational lever in a direction so as to constantly maintain a supported state of a lower supported portion by a lower support portion and a supported state of an upper supported portion by an upper supporting portion.

5 Claims, 9 Drawing Sheets

(52) U.S. Cl.
CPC ............ *B60N2/0875* (2013.01); *B60N 2/0887* (2013.01); *B60N 2205/20* (2013.01)

(56) References Cited

U.S. PATENT DOCUMENTS

| | | | |
|---|---|---|---|
| 5,323,998 A * | 6/1994 | Aihara | 248/430 |
| 6,264,159 B1 * | 7/2001 | Su | 248/430 |
| 7,318,573 B2 * | 1/2008 | Yamada et al. | 248/424 |
| 7,594,755 B2 * | 9/2009 | Ropp | 384/34 |
| 7,717,392 B2 * | 5/2010 | Sakakibara et al. | 248/429 |
| 8,136,784 B2 * | 3/2012 | Yamada et al. | 248/424 |
| 8,251,336 B2 * | 8/2012 | Kimura et al. | 248/430 |
| 8,469,327 B2 * | 6/2013 | Hayashi | 248/429 |
| 8,616,515 B2 * | 12/2013 | Hayashi | 248/429 |
| 8,708,300 B2 * | 4/2014 | Fujishiro et al. | 248/429 |
| 8,714,509 B2 * | 5/2014 | Hayashi | 248/429 |
| 8,770,534 B2 * | 7/2014 | Nakamura et al. | 248/429 |
| 2001/0013570 A1 * | 8/2001 | Yoshida et al. | 248/429 |
| 2002/0060281 A1 * | 5/2002 | Okazaki et al. | 248/424 |
| 2002/0179798 A1 * | 12/2002 | Fuller | 248/429 |
| 2003/0230696 A1 * | 12/2003 | Yamada et al. | 248/424 |
| 2004/0126039 A1 * | 7/2004 | Kashiyama et al. | 384/38 |
| 2007/0069099 A1 * | 3/2007 | Kohmura | 248/430 |
| 2008/0193062 A1 * | 8/2008 | Ropp | 384/34 |
| 2010/0140438 A1 * | 6/2010 | Semenchenko | 248/429 |
| 2010/0176265 A1 * | 7/2010 | Kojima et al. | 248/429 |
| 2010/0243852 A1 * | 9/2010 | Muraishi | 248/429 |
| 2011/0163217 A1 * | 7/2011 | Kimura et al. | 248/429 |
| 2012/0074289 A1 * | 3/2012 | Kimura et al. | 248/430 |
| 2012/0132778 A1 * | 5/2012 | Nakamura et al. | 248/429 |
| 2012/0318948 A1 * | 12/2012 | Yamada et al. | 248/429 |

OTHER PUBLICATIONS

Patent Abstracts of Japan—JP 2005-238929.
Patent Abstracts of Japan—JP 2008-265695.

* cited by examiner

SLIDE RAIL DEVICE FOR VEHICLE

TECHNICAL FIELD

The present invention relates to a slide rail device for a vehicle which supports a seat in a slidable manner.

BACKGROUND ART

A slide rail device for a vehicle disclosed in Patent Literature 1 is equipped with a pair of left and right lower rails which extend in a forward/rearward direction, are fixed to a vehicle interior floor, and include a large number of lock grooves, arranged in the forward/rearward direction; a pair of left and right upper rails which support the seating portion of a seat and are slidably supported by the pair of left and right lower rails; a pair of left and right lock levers which is rotatably supported on the left and right upper rails about an axis that extends in the leftward/rightward direction, which is disengageably-engageable with the lock grooves and, except the front end portions thereof, are each provided in an internal space of the associated upper rail; a biaser provided in the internal space of each upper rail and which rotatably biases the locking lever toward a direction of engagement with the lock grooves; and an operational lever (loop handle), having an approximately U-shape in a plan view, the left and right rear end portions thereof being mounted to the front end portions of the left and right lock levers (the portions that project forwardly from the upper rails).

When an occupant applies no operating force to the operational lever, the sliding of the upper rail relative to the lower rail is restricted since the lock lever is engaged with some of the lock grooves by the biasing force of the biaser. On the other hand, upon an occupant pulling up the operational lever, since each lock lever is released from the engagement with the lock grooves against the biasing force of the biaser, the upper rails can slide relative to the lower rails.

CITATION LIST

Patent Literature

PATENT LITERATURE 1: Japanese Unexamined Patent Publication No. 2008-265695

SUMMARY OF THE INVENTION

Technical Problem

In the slide rail device for vehicle of Patent Literature 1, in the case where the lock grooves are shallow (in the case where there is little play between the lock grooves and the lock lever), since the engagement of the lock lever with the lock grooves releases only by slightly rotating the operational lever upward, it is difficult for the operator to obtain a favorable operational feel.

Whereas, this problem is resolved if a structure is configured in which the engagement between the lock lever and the lock grooves cannot be released unless the operational lever is rotated upward by a large amount by increasing the length, etc., of the lock grooves. However, since each lock lever is provided in an internal space of the upper rail, the rotatable range thereof (rotational angle) is restricted to a narrow range. Therefore, it is difficult to increase the rotatable range of the lock lever in the slide rail device of Patent Literature 1.

Furthermore, it is necessary to increase the biasing force of the biaser in order to prevent the engagement between the lock lever and the lock grooves from being unintentionally released, however, if such a configuration is created, the operator would need to rotate the operational lever with a strong rotational force when carrying out a lock release.

The present invention provides a slide rail device for a vehicle which, even if the rotatable range of a lock operational lever is limited to a narrow range by the upper rails, the rotatable range of the handle which is connected to the lock operational lever can be enlarged, and in which it is possible to reduce the necessary operational force for carrying out the lock release.

Solution to Problem

A slide rail device for a vehicle according to the prevent invention is characterized by a lower rail which extends in a forward/rearward direction and is immovable relative to a floor of the vehicle; an upper rail which supports a seat and is supported by the lower rail to be slidable in the forward/rearward direction; a lower support portion provided on the upper rail; a lock mechanism, provided between the upper rail and the lower rail, which restricts or releases restriction of sliding of the upper rail; a lock operational lever provided in an internal space of the upper rail, a portion of the lock operational lever which is rearward from the lower support portion being rotatably supported by the upper rail, and the lock operational lever being upwardly/downwardly rotatable between a locked position, at which the sliding restriction is allowed by the lock mechanism, and an unlocked position, at which a front portion of the lock operational lever moves further upward than the locked position to release the sliding restriction; an upper supporting portion provided on the lock operational lever, the upper supporting portion positioned further forward than the lower support portion and further upward than the lower support portion; a handle provided with a lower supported portion on an underside thereof which is rotatably supported by the lower support portion, and an upper supported portion on an upper side thereof which is positioned further forward than the lower supported portion and is rotatably supported by the upper supporting portion, the handle projecting forwardly from the lock operational lever; and a biaser which rotatably biases the handle with respect to the lock operational lever in a direction so as to constantly maintain a supported state of the lower supported portion by the lower support portion and a supported state of the upper supported portion by the upper supporting portion.

A slide rail device for a vehicle according to the prevent invention is characterized by the lock mechanism including a lock biaser which biases the lock operational lever toward the locked position, wherein L1, L2, L3 and L4 are set so that:

F1=F×L1/L2×L3/L4<F2=F×L1/(L2+L4), wherein, when the lock operational lever is positioned at the locked position, L1 designates the distance in the forward/rearward direction from the action position between the lock operational lever and the lock biaser to the rotational center position of the lock operational lever; L2 designates the distance in the forward/rearward direction from the rotational center position to the upper supporting portion; L3 designates the distance in the forward/rearward direction from the upper supporting portion to the lower support portion; L4 designates the distance in the forward/rearward direction from the upper supporting portion to an operation portion of the handle; and F designates a force which the lock operational lever applies on the lock mechanism, when the sliding restriction by the lock mechanism is released by the lock operational lever.

The lock operational lever can be rotatably biased toward the locked position. When the lock operational lever is positioned at the locked position, the lower support portion and the upper supporting portion maintain a relative rotational position of the handle with respect to the lock operational lever at a predetermined position.

Advantageous Effects of the Invention

According to the invention of claim 1, upon the front portion of the handle being rotated upward relative to the lock operational lever when the lock operational lever is positioned at the locked position, since the lock operational lever rotates to the unlocked position so that the sliding restriction by the lock mechanism is released, the upper rail becomes slidable relative to the lower rail.

The rotational amount of the handle during this operation is larger compared to the rotational amount of the lock operational lever (the rotational amount of the lock operational lever is smaller compared to the rotational amount of the handle). Accordingly, even if there is little play between the lock mechanism and the lock operational lever, the sliding restriction will not be released by the lock mechanism just by the handle slightly rotating upward. Therefore, the operator can obtain a favorable operational feel during a lock-release operation. Furthermore, since the rotatable range of the lock operational lever can be made small, the lock mechanism can securely transfer to an unlocked state even if the rotatable range of the lock operational lever is restricted to a narrow range by the upper rail.

According to the invention of claim 2, since the necessary force for rotating the handle upward during a lock release operation becomes small compared to the case where the handle and the lock operational lever are fixed (are not relatively rotatable), the operator can carry out a lock releasing operation with a small amount of force.

According to the invention of claim 3, the handle can be prevented from unintentionally rotating so as to release the locked state when the lock operational lever is at the locked position (when the upper rail is restricted from sliding relative to the lower rail).

DESCRIPTION OF EMBODIMENTS

Figure 1:
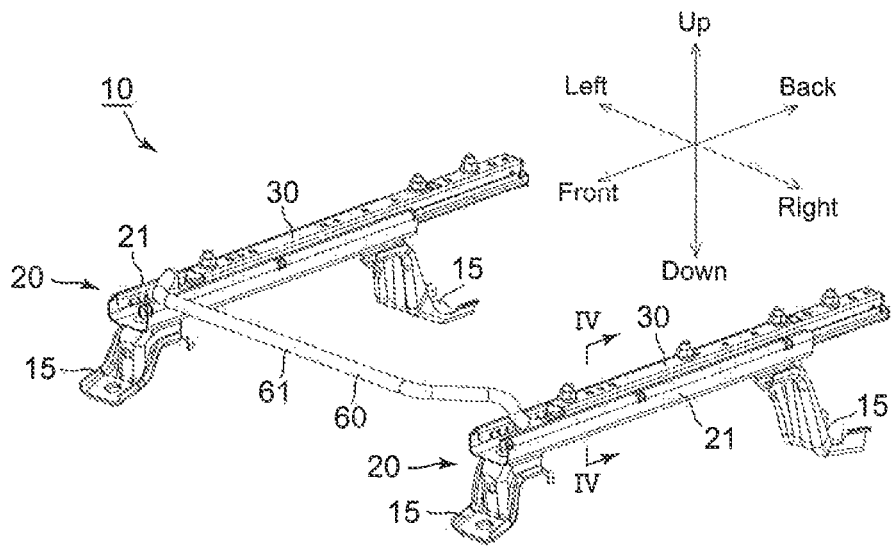
FIG. 1 is a front perspective view of an embodiment of the slide rail device, according to the present invention, viewed obliquely from above, in which the upper rails have been slided to the rear ends.
Figure 2:
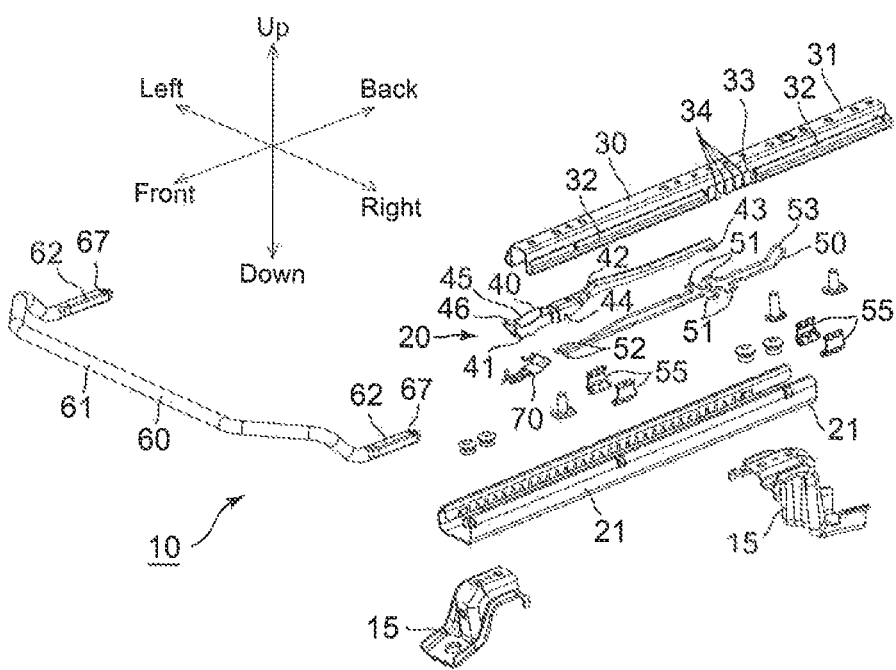
FIG. 2 is an exploded perspective view of the front of the slide rail device with the left rail unit omitted, viewed obliquely from above.
Figure 3:
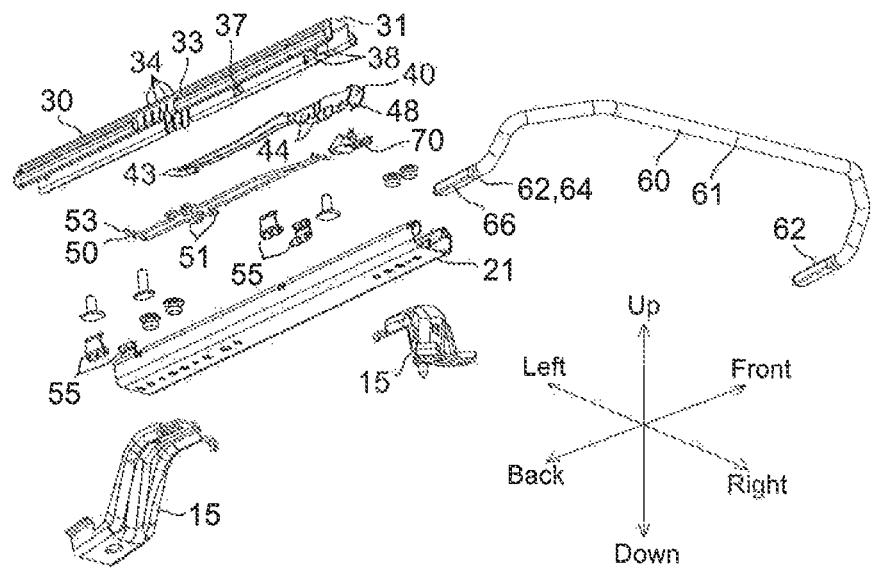
FIG. 3 is an exploded perspective view of the front of the slide rail device with the left rail unit omitted, viewed obliquely from below.

An embodiment of the present invention will be hereinafter discussed with reference to the attached drawings. Note that directions described in the following description are defined based on the directions of arrows shown in the drawings.

A slide rail device 10 is installed onto a vehicle interior floor of an automobile (vehicle) not shown in the drawings. A seat (not shown) is fixed to upper surfaces of the slide rail device 10 (upper rails 30).

The detailed structure of the slide rail device 10 will be discussed hereinafter.

The slide rail device 10 is provided, as large components thereof, with a pair of left and right rail units 20, and a loop handle 60 which connects the front ends of the left and right rail units 20. The left and right rail units 20 are bilaterally-symmetrical while the loop handle 60 has a bilaterally-symmetrical shape, and hence, the slide rail device 10 is bilaterally symmetrical as a whole.

The left and right rail units 20 have the following structure.

Figure 5:
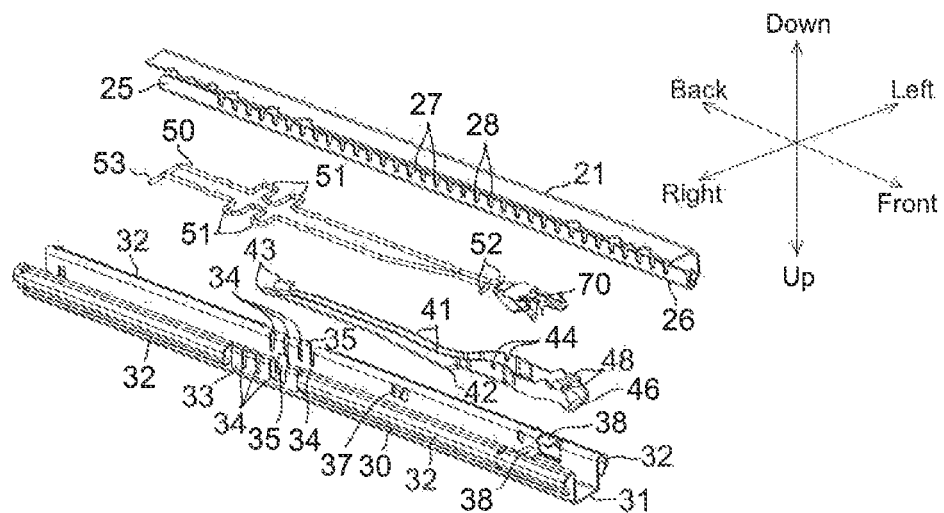
FIG. 5 is an exploded perspective view of a rail unit showing the lower rail in a longitudinal sectional view.

Each rail unit 20 is provided with a lower rail 21 which is mounted onto the vehicle interior floor via a pair of front and rear mounting brackets 15. Each lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, and left and right pair of roof underside portions 24 which extend inward from the top edges of the left and right pair of outer wall portions 23, respectively, and a pair of left and right inner wall portions (vertical walls) 25 which extend downwardly from the inner edges of the left and right roof underside portions 24. As shown in FIG. 5, etc., the upper edge portions of the left and right inner wall portions 25 (the portions connected to the roof underside portions 24) constitute base-end supporting portions 26 that extend in the forward/rearward direction. Lower edge portions of the left and right inner wall portions 25 are provided with a large number of lock teeth (lock mechanism) 27, the upper ends thereof connecting with the base-end supporting portions 26, arranged at equal intervals in the forward/rearward direction. Lock grooves (lock mechanism) 28, the bottom ends of which are open, are formed between mutually adjacent lock teeth 27.

Figure 6:
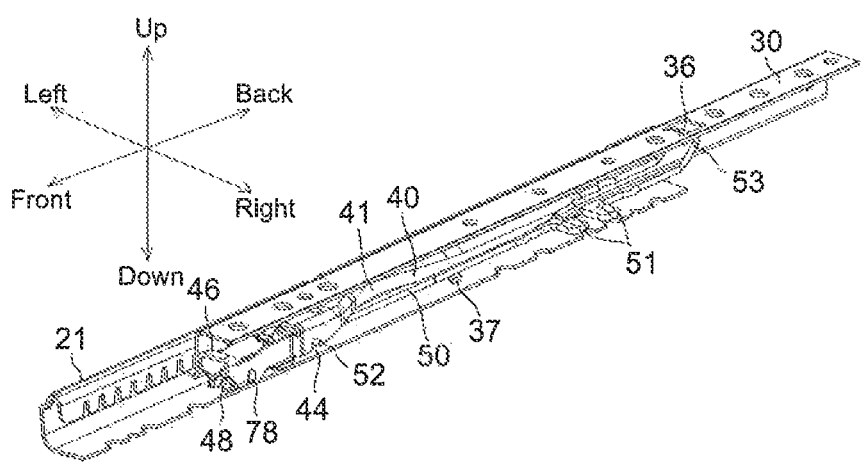
FIG. 6 is a front perspective view of the rail unit showing a cross sectional view of the lower rail, viewed obliquely from above.
Figure 7:
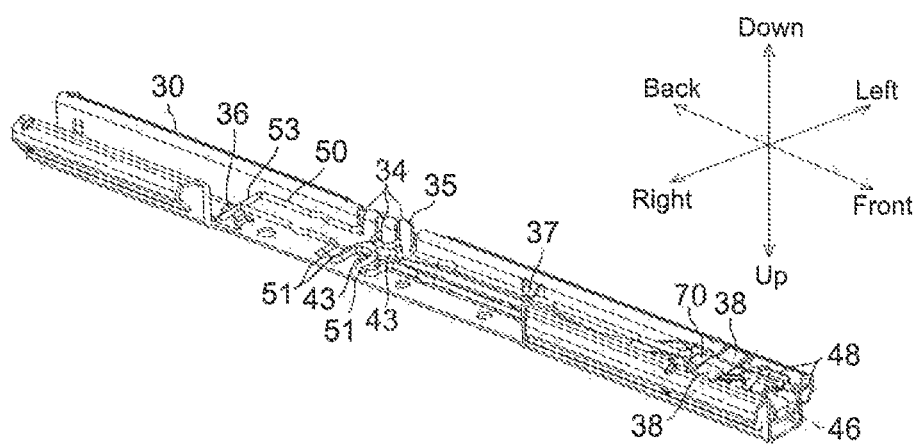
FIG. 7 is a front perspective view of the upper rail, with a section thereof cut-away, a lock-release lever, and a lock spring, viewed obliquely from below.

Each rail unit 20 is provided with an upper rail 30 that is slidable in the forward/rearward direction with respect to the associated lower rail 21. The upper rail 30 is a metal channel member which extends in the forward/rearward direction and the bottom thereof is open, and is provided with a base 31 having a substantially inverted U-shaped cross section, upright walls 32 which extend upward from lower end portions of the left and right side walls of the base 31, except central portions thereof in the longitudinal direction, and locking walls 33 which extend upward from the above-mentioned central portions of the side walls. As shown in FIGS. 2, 3, 5 and 9, etc., four forward/rearward movement restriction grooves 34 are formed over the lower edges of the left and right locking walls 33 and the lower edges of the side walls of the base 31 to extend upward. Furthermore, a downward restriction piece 35, which extends further downward than the lower edge of the forward/rearward movement restriction grooves 34, is integrally provided on a lower edge portion of the side wall portion of the base 31 at a position facing the locking walls 33. In addition, as shown in FIGS. 6 and 7, etc., the base 31 is provided, in the vicinity of a central portion of the roof portion thereof, with a lock-engaging lug 36 which is formed by cutting and raising a portion of the base 31 to extend downward and rearward. Inward-extending lock-engagement pieces 37 are respectively formed by cutting and raising portions of the left and right side wall portions of the base portion 31, at a position slightly in front of central portions of the left and right side wall portions. Furthermore, substantially horizontal lower support portions 38, which project inwardly from the lower edges of the left and right side walls, are integrally provided on the base 31 near the front end thereof.

Each rail unit 20 is further provided with a lock release lever (lock operational lever) 40, a lock spring (lock biaser) 50, and a biasing spring (biaser) 70 that are installed in the associated upper rail 30.

The lock release lever 40 is a press-molded metal channel member, formed from a metal plate, which extends in the forward/rearward direction and the bottom thereof is open, and is provided with a pair of left and right side walls 41. As shown in FIGS. 2, 5, 10 and 11, etc., a rotational contact protrusion 42 which extends in the leftward/rightward direction is protruded from an upper surface of the lock release lever 40. In addition, a pair of left and right substantially horizontal spring pressing-pieces 43 are respectively provided on the rear end portion of the lock release lever 40, and upward-facing spring-hook grooves 44 in the lower edges of the front portions (the portions positioned forward from the rotational contact protrusion 42) of the left and right side walls 41, respectively. As shown in FIG. 12, etc., a roof hole 45 is formed in the upper side of the lock release lever 40 in the vicinity of the front end thereof, and an upper supporting portion 46 is formed at the upper portion of the front end of the lock release lever 40 to connect the front ends of the left and right side walls 41. Furthermore, a spring-hook recess 47 is formed at the lower edge at the vicinity of the front ends of the side walls 41, and inwardly-facing substantially horizontal underside supporting pieces 48 are provided on the lower edges of the front ends of the left and right side walls 41.

A biasing spring 70 is a bilaterally-symmetrical member that is press-formed out of a metal plate. The biasing spring 70 is provided with a flat-plate base-surface supporting portion 71; an upper-surface pressing piece 72 which extends rearwardly from the rear end of the base-surface supporting portion 71, and thereafter extends obliquely forward and upward, and thereafter extends obliquely forward and downward; a base-surface pressing piece 76 which extends obliquely forward and upward from a front edge of the base-surface supporting portion 71 and the front end of the base-surface pressing piece 76 is bent obliquely forward and downward; and a pair of left and right side arms 77 which extend forward from the front edge of the base-surface supporting portion 71. The rear end portion of the upper-surface pressing piece 72 forms an insertion end 73 having a substantially sideways V-shape, in a side elevational view, and a handle pressing portion 74, which is provided with a pair of left and right downward-facing lock-engagement pieces 75, is formed on the front end portion of the upper-surface pressing piece 72. Furthermore, upward-facing lock-engagement pieces 78 are provided on the left and right side arms 77, in the vicinity of the front ends thereof.

The biasing spring 70 is inserted into an internal space (the space located directly below the roof hole 45) of the front-end portion of the lock release lever 40 from the front-end opening (between the upper supporting portion 46 and the underside supporting pieces 48) of the lock release lever 40. When the biasing spring 70 is inserted, the insertion end 73 of the biasing spring 70 is inserted into the downward-facing U cross-sectional shaped portion of the lock release lever 40 (in a space located behind the space that is directly below the roof hole 45) (see FIG. 15), and furthermore, since the left and right side arms 77 are placed on the upper surfaces of the underside supporting pieces 48 and the upward-facing lock-engagement pieces 78 engage with the left and right spring-hook recesses 47 of the lock release lever 40 from below, biasing spring 70 becomes integral with the lock release lever 40.

The lock spring 50 is a bilaterally-symmetrical member formed by bending a metal wire rod. A pair of front and rear locking portions 51 which extend substantially horizontally outwards are formed on portions of both left and right side portions of the lock spring 50 which are positioned slightly behind central portions thereof in the longitudinal direction, respectively. The part of the lock spring 50 (except the rear end portion thereof) that is positioned behind the locking portions (lock mechanism) 51 is substantially horizontal when in a free state, and the part of the lock spring 50 (except the front end portion thereof) that is positioned in front of the locking portions 51 is substantially horizontal when in a free state. The lock spring 50 is provided at the front end thereof with a pair of left and right front-end locking lugs 52 which project outwardly in a substantially horizontal direction, and the rear-end portion of the lock spring 50 constitutes a rear-end lock-engaging portion 53, which is inclined upwardly in a side elevational view.

Figure 9:
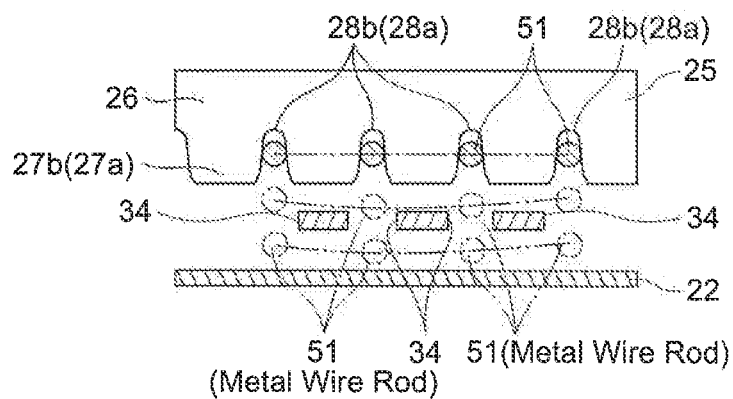
FIG. 9 is a schematic side elevational view showing states when the lock spring is positioned at the locked position and the lock-release position.
Figure 10:
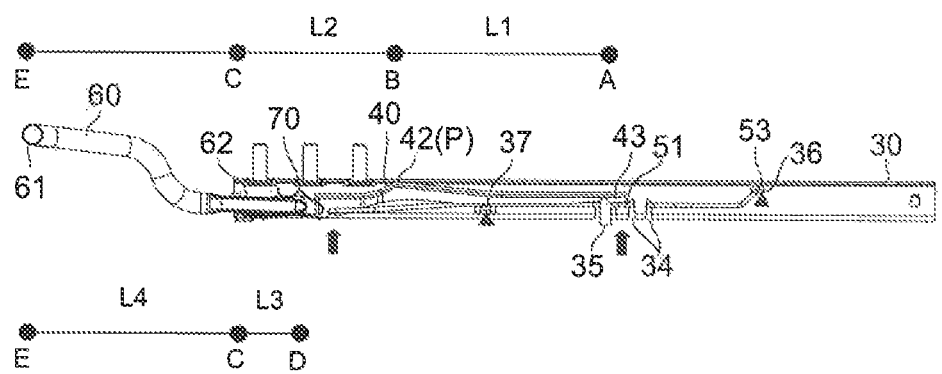
FIG. 10 is a side elevational view of the upper rail, the lock-release lever, a biasing spring and a loop handle, when in a locked state, in which only the upper rail is shown as a longitudinal section view.
Figure 11:
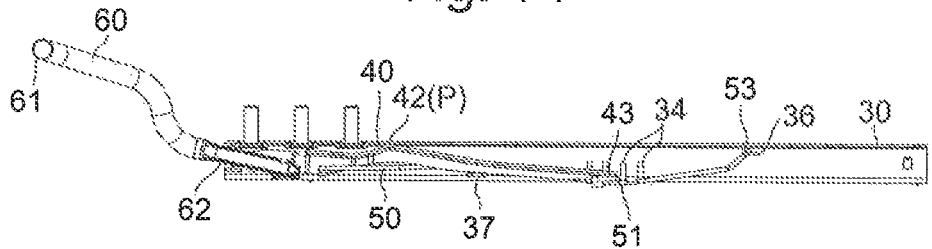
FIG. 11 is side elevational view similar to that of FIG. 10 when in an unlocked state, with the biasing spring omitted.
Figure 12:
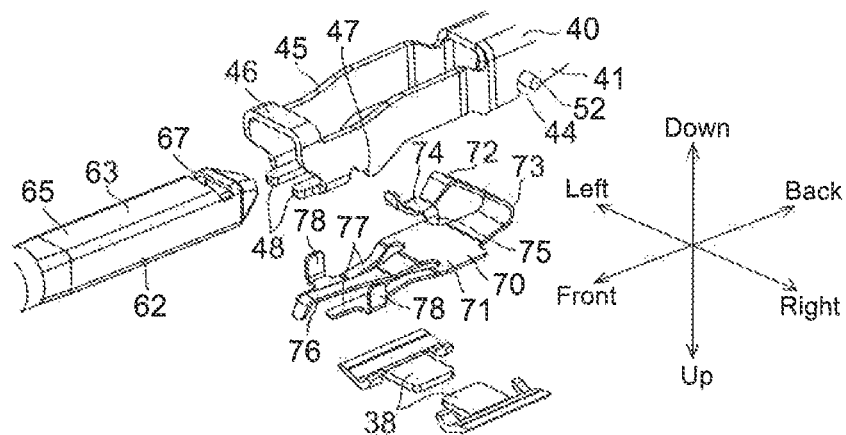
FIG. 12 is an enlarged exploded perspective view showing the front-end portion of the lock-release lever, the biasing spring, a lower supporting portion, and a rear-end portion of the loop handle.
Figure 13:
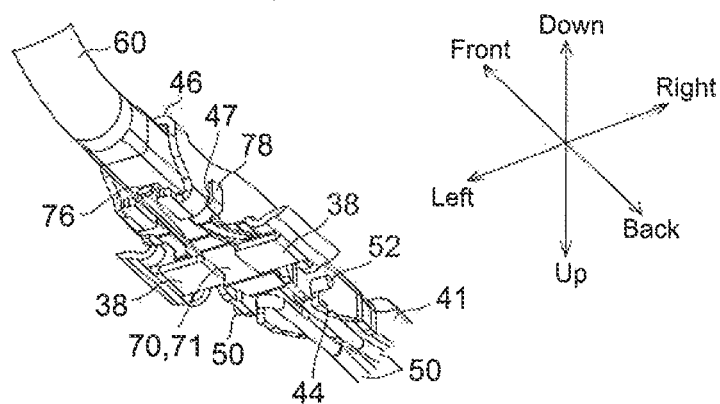
FIG. 13 is an enlarged perspective view of the front-end portion of the lock-release lever, the biasing spring, and the rear-end portion of the loop handle when mutually assembled with each other, viewed from below.
Figure 14:
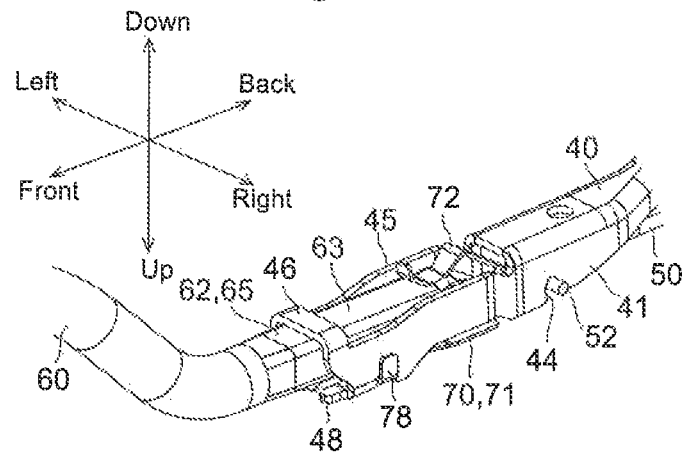
FIG. 14 is an enlarged perspective view of the front-end portion of the lock-release lever, the biasing spring, and the rear-end portion of the loop handle when mutually assembled with each other, viewed from above.
Figure 15:
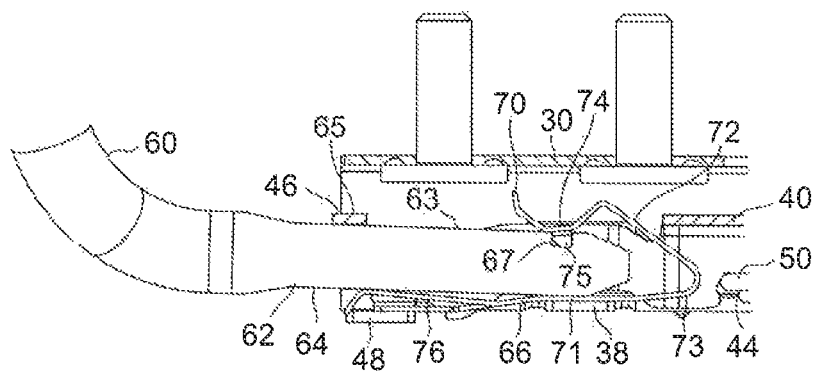
FIG. 15 is an enlarged longitudinal sectional view of the front end portions of the upper rail and the lock-release lever, the biasing spring and the rear end portion of the loop handle.
Figure 16:
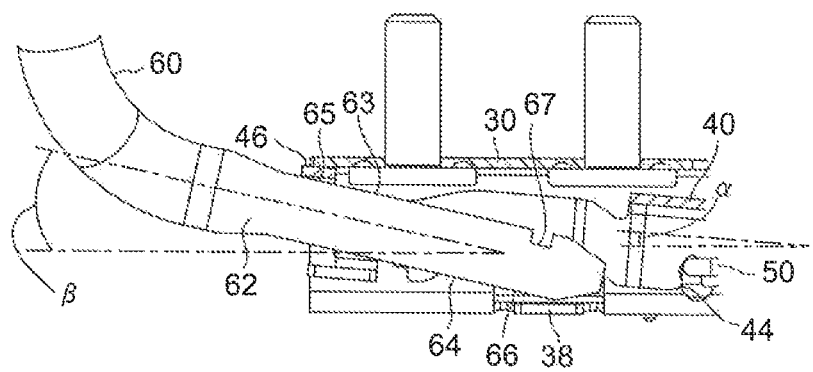
FIG. 16 is an enlarged longitudinal sectional view, similar to that of FIG. 15, in an unlocked state with the biasing spring omitted.
Figure 21:
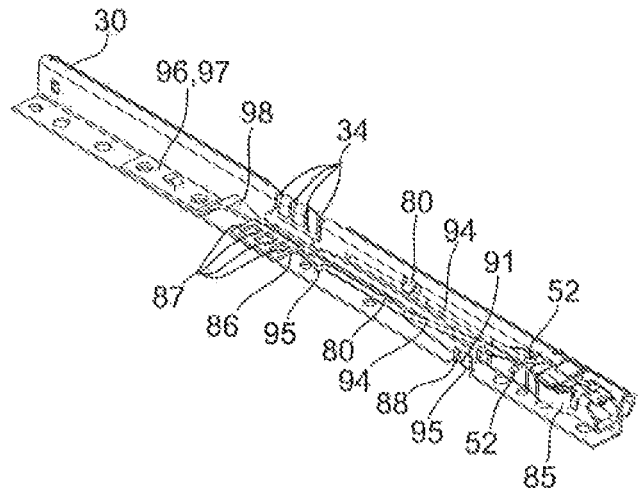
FIG. 21 is a perspective view similar to that of FIG. 7.
Figure 22:
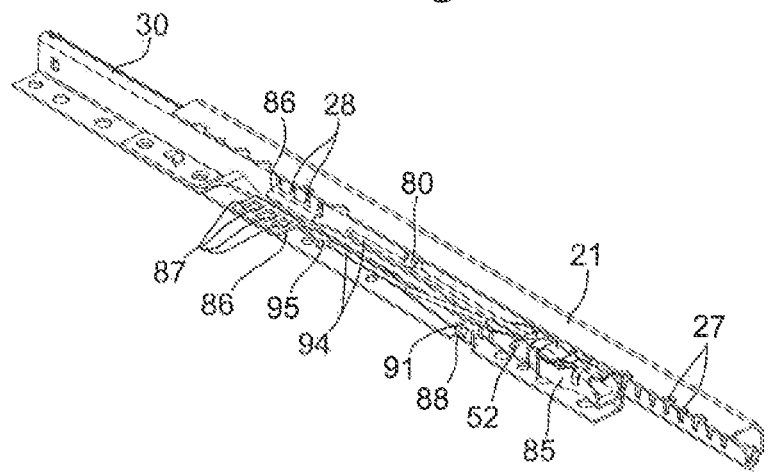
FIG. 22 is a perspective view similar to that of FIG. 8.

The lock release lever 40 (and the biasing spring 70) is almost entirely accommodated in the associated upper rail 30 from the front end opening thereof (between the front end portion of the base 31 and the lower support portions 38) (as shown in FIGS. 15 and 16, only the front end portion of the upper supporting portion 46 projects forwardly from the upper rail 30), and the rotational contact protrusion 42 is in contact with a roof undersurface of the base 31 (see a contact portion "P" in FIGS. 10 and 11. Spaces are formed between the upper surface of the lock release lever 40 except the rotational contact protrusion 42 and a roof undersurface of the base 31). As shown in FIGS. 6 through 8, FIG. 10 and FIG. 11, in the lock spring 50, the rear-end lock-engaging portion 53 is lock-engaged with the lock-engaging lug 36 (see the triangular mark in FIG. 10), portions of the lock spring 50 positioned slightly forward from the locking portions 51, on the left and right side portions of the lock spring 50, are respectively lock-engaged with the left and right lock-engagement pieces 37 (see the triangle in FIG. 10), each locking portion 51 is engaged with an associated forward/rearward movement restriction groove 34 from below, and furthermore, the left and right front-end locking lugs 52 are lock-engaged with the spring-hook grooves 44 from below, and the spring pressing-pieces 43 come in contact with the upper surface of the portion positioned between the pair of locking portions 51 of the lock spring 50 from above. Upon assembling the lock spring 50 into the upper rail 30 and the lock release lever 40 in the above manner, the lock spring 50 is moveable relative to the upper rail 30 in the forward/rearward direction within a minute range that maintains lock engagement between the front-end locking lugs 52 and the spring-hook grooves 44 and in which the lock engagement between the rear-end lock-engaging portion 53 of the lock spring 50 and the lock-engaging lug 36 is not released. In addition, the front portion and the rear portion of the lock spring 50 produces an upward biasing force (elastic force) by being elastically deformed (see arrows ↑ shown in FIG. 10), and accordingly, this biasing force causes the rotational contact protrusion 42 of the lock release lever 40 to be pressed against the roof underside portion of the base 31, which allows the lock release lever 40 to rotate about the rotational contact protrusion 42 (about an imaginary rotation axis in the leftward/rightward direction) about the contact portion P between the roof underside portion and the rotational contact protrusion 42, and the lock release lever 40 is held in the locked position shown in FIGS. 10 and 15 when no upward external force is exerted on the front end portion of the lock release lever 40. On the other hand, exerting an upward external force on the front end portion of the lock release lever 40 against the biasing force of the lock spring 50 causes the lock lever 40 to rotate to the unlocked position shown in FIGS. 11 and 16. Thereupon, as shown in FIGS. 16 and 21, since the spring pressing-pieces 43 of the lock release lever 40 downwardly depress the portions of the lock spring 50 which are positioned between the pair of locking portions 51, each locking portion 51 escapes downward from the associated lock groove 28 (see the locking portions 51 indicated with the imaginary lines shown in FIG. 9).

Figure 4:
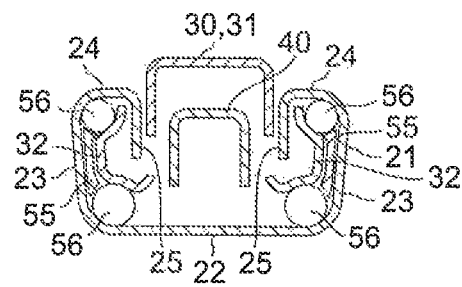
FIG. 4 is a cross sectional view taken along the line IV-IV shown in FIG. 1.

An assembly made by inserting an upper rail 30, a lock release lever 40 and a lock spring 50, which are integrated in the above described manner, into one lower rail 21 from the front end opening or rear end opening of the lower rail 21 constitutes a rail unit 20. When a rail unit 20 is assembled, the upright walls 32 and the locking walls 33 of the upper rail 30 enter the spaces formed between the outer wall portions 23 and the inner wall portions 25 as shown in FIG. 4 (the locking walls 33 are omitted in FIG. 4), and a plurality of bearing balls 56 which are rotatably supported by retainers 55 installed in the aforementioned spaces are in rotatable contact with both outer surfaces of the upright walls 32 and inner surfaces of the outer wall portions 23, which allow the upper rail 30 (and the lock release lever 40 and the lock spring 50) to slide in the forward/rearward direction with respect to the lower rail 21. Furthermore, since a front-end stopper and a rear-end stopper, which are omitted from the drawings, are provided between the upper rail 30 and the lower rail 21, each upper rail 30 is slidable relative to the lower rail 21 between a front-end position (not shown) and a rear-end position (the position in FIG. 1).

Figure 8:
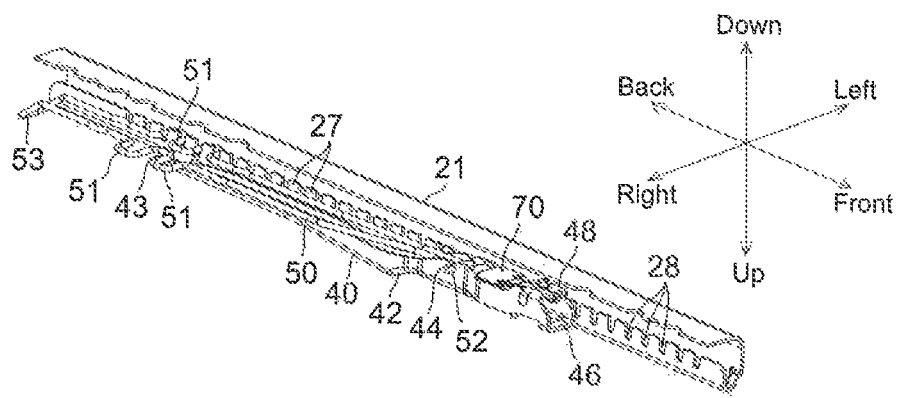
FIG. 8 is a front perspective view of the lower rail, shown as a longitudinal section view, the lock-release lever, and the lock spring, viewed obliquely from below.

In addition, when the lock release lever 40 is in the locked position, the upper rail 30 is prevented from sliding with respect to the lower rail 21 because each locking portion 51 is engaged with the associated forward/rearward movement restriction groove 34 and lock groove 28 from below as shown in FIG. 8 and by solid lines in FIG. 9. On the other hand, rotating the lock release lever 40 down to the unlocked position causes each locking portion 51 which was engaged with some of the lock grooves 28 to be disengaged downward therefrom as shown by the phantom lines in FIG. 9, which allows the upper rail 30 to slide with respect to the lower rail 21.

The pair of left and right rail units 20 thus assembled are made to be parallel to each other and the positions thereof in the forward/rearward direction are made to coincide with each other (the sliding positions of the upper rails 30 with respect to the lower rails 21 are also made to coincide with each other); thereafter, a seating portion of a seat (not shown) is mounted onto the upper surfaces of the upper rails 30.

After the left and right rail units 20 and the seat are integrated in this manner, the loop handle (handle) 60 is connected to the left and right lock release levers 40 using the biasing springs (biaser) 70.

The loop handle 60 is made by bending a metal pipe member, and is provided with an operation portion 61 which extends in the leftward/rightward direction, a pair of oblique portions extending obliquely rearwardly downward from both left and right ends of the operation portion 61, and a pair of rear-end connecting portions 62 which respectively extend rearwardly from both left and right ends of the oblique portions. An upper contacting surface 63 and the lower contacting surface 64 of each rear-end connecting portion 62 are mutually parallel (horizontal) flat surfaces. The front end of each upper contacting surface 63 constitutes an upper supported portion 65, and the rear end of each lower contacting surface 64 constitutes a lower supported portion 66. Furthermore, a lock-engaging groove 67 which extends in the leftward/rightward direction is formed in the vicinity of the rear end of each upper contacting surface 63.

The loop handle 60 is connected to the lock release levers 40 by inserting the left and right rear-end connecting portions 62 into the internal spaces of the front ends of the lock release levers 40, respectively. Upon inserting the rear-end connecting portions 62, each rear-end connecting portion 62 enters into a space between the base-surface supporting portion 71 and the upper-surface pressing piece 72 (handle pressing portion 74), the base-surface supporting portion 71 contacts the lower contacting surface 64, the left and right downward-facing lock-engagement pieces 75 engage with the lock-engaging groove 67, and the handle pressing portion 74 comes in contact with the vicinity of the rear end of the upper contacting surfaces 63 (the periphery of the lock-engaging groove 67). Since upward/downward space between the base-surface supporting portion 71 and the handle pressing portion 74 is narrower than the upward/downward dimensions of the rear-end connecting portions 62 before the rear-end connecting portions 62 are inserted into each internal space of the front end portion of each lock release lever 40, when the rear-end connecting portion 62 is inserted in the space between the base-surface supporting portion 71 and the upper-surface pressing piece 72 (handle pressing portion 74), the upper-surface pressing piece 72 elastically deforms upwards, and the pressing force from the base-surface supporting portion 71 and the handle pressing portion 74 respectively applies against the lower contacting surface 64 and the upper contacting surfaces 63. Furthermore, the vicinity of the front end of the base-surface pressing piece 76, which has elastically deformed downwardly, comes in contact with the front portion of the lower contacting surface 64. Subsequently, the left and right rear-end connecting portions 62 and the front ends of the lock release levers 40 become integral with each other via the biasing springs 70, respectively, and each rear-end connecting portion 62 is, in effect, restricted from moving in the forward/rearward direction relative to the lock release lever 40.

Upon assembling the slide rail device 10 by integrating the loop handle 60 with the left and right rail units 20, as described above, since the rear-end connecting portions 62 constantly receive an upward biasing force from the base-surface pressing pieces 76 and constantly receive a downward biasing force from the upper-surface pressing pieces 72 (handle pressing portions 74), each upper supported portion 65 is constantly in contact (so as to be rotatable about an axis extending in the leftward/rightward direction) with the corresponding upper supporting portion 46, each lower supported portion 66 is constantly in contact with the associated base-surface supporting portion 71, and the base-surface supporting portion 71 is constantly in contact (so as to be rotatable about an axis extending in the leftward/rightward direction) with the associated lower support portion 38.

An assembled slide rail device 10 is attached to the vehicle interior floor by mounting the mounting brackets 15, to which the left and right lower rails 21 are mounted, onto the vehicle interior floor.

Operations of the slide rail device 10 will be hereinafter discussed.

Upon the occupant grasping the operation portion 61 by hand and rotating the entire loop handle 60 upwards, this rotational force is transmitted from the rear-end connecting portions 62 to the front end portions of the lock release levers 40, so that the lock release levers 40 rotate upwardly with the rear-end connecting portions 62. Accordingly, since the lock release levers 40 that were positioned at the locked position rotate to the unlocked position, the upper rails 30, which were restricted from sliding relative to the lower rail 21, become slidable relative to the lower rails 21.

In this state, details of the rotational operation of each rear-end connecting portion 62 and the associated lock release lever 40 are as follows.

As shown in FIGS. 10 and 15, when the occupant does not apply force on the loop handle 60, since the upper supported portion 65 and the lower supported portion 66 come in surface contact with the upper supporting portion 46 and the base-surface supporting portion 71, respectively, the rear-end connecting portion 62 is held at a position such that the axis of the rear-end connecting portion 62 coincides with the axis of the front end portion of the lock release lever 40. Upon the loop handle 60 being rotated upward from this state, the left and right rear-end connecting portions 62 relatively rotate with respect to the upper rails 30 about the contacting portion between the upper supporting portion 46 and the upper supported portion 65 and about the contacting portion between the lower support portions 38 and the base-surface supporting portion 71, and furthermore, the rear end portion of the lock release lever 40, the upper supporting portion 46 of which is pressed upwards by the upper supported portion 65, rotates downwardly about the rotational contact protrusion 42 (P) (see FIG. 11 and FIG. 16). An upward lifting force F1 of the operation portion 61 that the occupant applies is:

$F1=F \times L1/L2 \times L3/L4$, wherein, when the occupant does not apply force on the loop handle 60, L1 designates the distance in the forward/rearward direction from point A (the action position of the spring pressing-pieces 43 against the locking portions 51), to point B (the position of the rotational contact protrusion 42, i.e., the rotational center position of the lock release lever 40); L2 designates the distance in the forward/rearward direction from point B to point C (the upper supporting portion 46); L3 designates the distance in the forward/rearward direction from point C to point D (lower support portions 38); L4 designates the distance in the forward/rearward direction from point C to point E (operation portion 61); and F designates the downward movement force that the spring pressing-pieces 43 apply onto the lock spring 50 when the lock release lever 40 is moved to the unlocked position (the locking portions 51 escape downward from the lock grooves 28).

Figure 17:
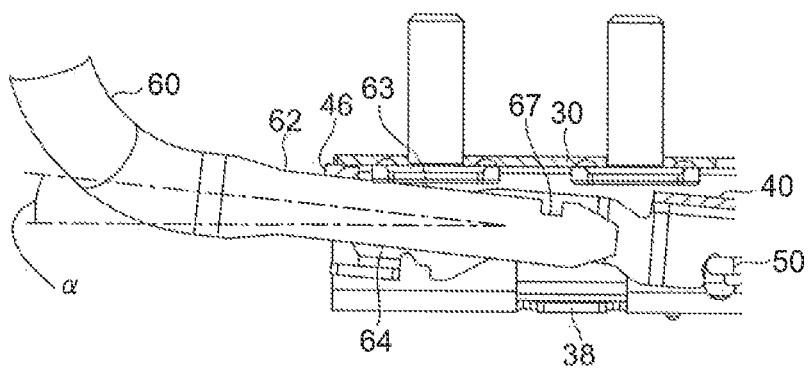
FIG. 17 is an enlarged longitudinal sectional view, similar to that of FIG. 15, of a comparative embodiment having a configuration in which the loop handle does not contact the lower supporting portion in an unlocked state.
Figure 18:
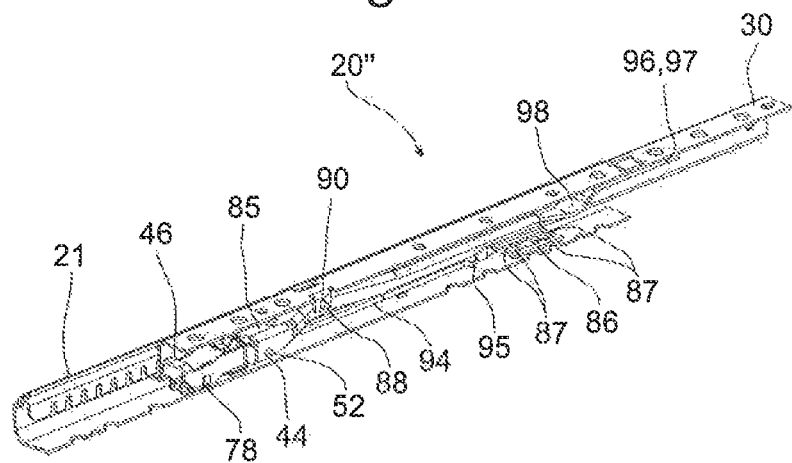
FIG. 18 is a perspective view, similar to that of FIG. 6, of a second embodiment.

Whereas, as shown in the comparative embodiment of FIG. 17, in the case of a configuration (a configuration in which the rear-end connecting portion 62 is fixed to the lock release lever 40) in which the rear-end connecting portion 62 rotates coaxially with the lock release lever 40, an upward lifting force F2 of the operation portion 61 that the occupant applies is:

$F2=F \times L1/(L2+L4)$.

In the present embodiment, since L1=125.7 mm, L2=96.0 mm, L3=36.5 mm, L4=115.1 mm:

F1=0.42F

F2=0.60F

Therefore, the occupant can carry out a lock release with a smaller force than in the case of the comparative embodiment of FIG. 17.

Furthermore, if point D is positioned further forward than point B, the upward rotational angle β of the loop handle (operation portion 61) relative to the upper rail 30, regardless of the dimensions of L1 through L4, is larger than the rotational angle α of the lock release lever 40 relative to the upper rail 30 (in the case of FIG. 17, the rotational angle of the loop handle 60 is also α). Accordingly, since the locked state is not released unless the occupant lifts the operation portion 61 upward by a reasonably large rotational angle, it is possible to give a comfortable operational feel to the occupant.

Furthermore, as shown in the drawings, since the lock release lever 40 is provided in an internal space of the upper rail 30, the rotatable range of the lock release lever 40 in the upward/downward direction is restricted to a narrow range. However, since the upward rotational angle (α) of the lock release lever 40 when carrying out a lock release is smaller than the upward rotational angle (β) of the loop handle 60, a lock release can be reliably carried out without making the lock release lever 40 contact the inner surface of the upper rail 30.

Next, a second embodiment of the present invention will be described while referring to FIGS. 18 through 22. Members that are the same as those in the previous embodiment are designated with the same designators, and a detailed description thereof have been omitted.

A rail unit 20″ of this embodiment is provided with a lock lever (lock operational lever) 85 instead of the lock release lever 40. The fundamental structure of the lock lever 85 is the same as that of the lock release lever 40, and is provided with the side walls 41, the spring-hook grooves 44, the roof hole 45, the upper supporting portion 46, the spring-hook recess 47, and the underside supporting pieces 48; the loop handle 60 is connected to the front end of the lock lever 85. Whereas, a pair of left and right horizontal lock-plates 86 are provided on the rear end of the lock lever 85. As shown in the drawings, each of the horizontal lock-plates 86 is provided with three rectangular through-holes formed therethrough, and the three rectangular through-holes define a total of four locking portions (lock mechanism) 87 which are arranged at equal intervals in the forward/rearward direction on the front and rear sides of the three rectangular holes, respectively. Furthermore, a pair of left and right cylindrical supported portions 88 which extend in the leftward/rightward direction are provided at the front portion of the lock lever 85.

Figure 19:
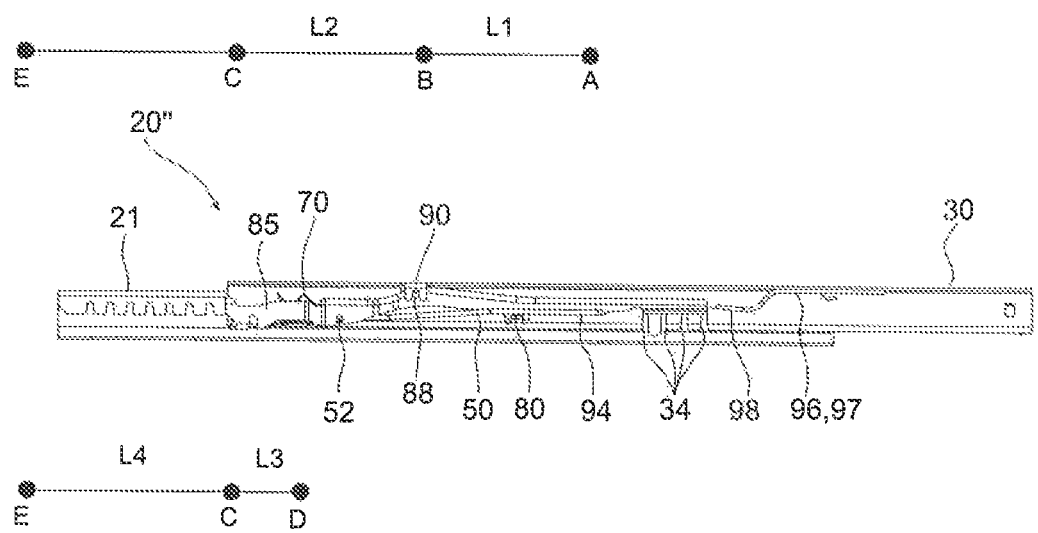
FIG. 19 is a longitudinal sectional view of the rail unit.
Figure 20:
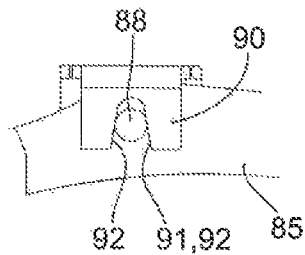
FIG. 20 is a enlarged plan view of a rotational supporting piece and a supported portion.

A pair of left and right rotational support members 90 are formed on the roof underside portion of the base 31 of the upper rail 30 by being cut and raised downwards. As shown in FIGS. 19 and 20, a V-groove (supporting groove) 91 which extends upward is formed in the lower edge of each rotational support member 90. As shown in the drawings, a pair of supporting surfaces 92 which define a front surface and a rear surface of each V-groove 91 are bisymmetrical in the forward/rearward direction and the mutual distance therebetween in the forward/rearward direction gradually narrows with respect to the upward direction. The left and right supported portions 88 of the lock lever 85 engage with the V-grooves 91 of the left and right rotational support members 90, respectively, from below. Furthermore, the locking portions 87 of the left and right the horizontal lock-plates 86 are engaged with the left and right forward/rearward-movement restricting grooves 34 from below. Although not shown in the drawings, the locking portions 87 of the horizontal lock-plates 86 are disengageably-engageable with the lock grooves 28 of the lower rail 21 from below.

Furthermore, instead of the lock spring 50, the slide rail device 20" is provided with a pair of left and right front biasing springs (lock biaser) 94 formed by a metal wire rod. The left and right front biasing springs 94 are mutually bilaterally symmetrical, and are provided with front-end lock-engaging lugs 52 at the front ends thereof which engage with the spring-hook grooves 44, respectively. The rear ends of the left and right front biasing springs 94 are provided with rear-end lock-engaging lugs 95, having the same shape as that of the front-end lock-engaging lugs 52, which respectively fit into support through-holes (not shown) respectively formed through the left and right side walls of the base 31 of the upper rail 30. Furthermore, since the intermediate portions of the left and right front biasing springs 94 are lock-engaged with intermediate lock-engaging members 80 (between the intermediate lock-engaging members 80 and the side walls of the base 31) from above, the upward biasing force is applied from the left and right front-end lock-engaging lugs 52 to the lock lever 85 (spring-hook grooves 44). Accordingly, due to this upward biasing force (engagement-assisting biasing force), the left and right supported portions 88 move up into the V-grooves 91, so that when the left and right supported portions 88 reach a predetermined vertical position, each left and right supporting portion 88 contacts the pair of front and rear supporting surfaces 92 at two forward/rearward points, and this contacting state is maintained by the above-mentioned biasing force. Accordingly, the lock lever 85 is rotatable about the supported portions 88 without jolting in the forward/rearward direction with respect to the upper rail 30. Furthermore, a base part 97 which forms a rear portion of a metal rear biasing spring (lock biaser) 96 is fixed to a rear portion of the underside surface of the roof of the base 31 of the upper rail 30. An elastically-deformable portion 98 is provided on the base part 97 so as to extend therefrom in the forward direction, and since the upper surface of the elastically-deformable portion 98 is constantly biasing the rear end of the lock lever 85 upward, the engagement of the locking portions 87 of the lock-plates 86 with the forward/rearward-movement restricting grooves 34 is constantly maintained. Furthermore, since the engagement between the cylindrical supporting portions 88 of the lock lever 85 and the V-grooves 91 is maintained due to the front biasing springs 94 and the elastically-deformable portion 98 applying an upward biasing force on the lock lever 85, the lock lever 85 is rotatable about the supporting portions 88 with respect to the upper rail 30. Furthermore, since the biasing force of the elastically-deformable portion 98 is larger than the biasing force of the front biasing springs 94, when an operational force is not applied to the loop handle 60, the lock lever 85 is positioned in a locked position (the position shown in FIG. 19) in which the locking portions 87 are engaged with the corresponding lock grooves 28. Whereas, if the occupant lifts the loop handle 60 upward against the biasing force of the elastically-deformable portion 98 (and the left and right front biasing springs 94), the lock lever 85 is rotated down to the unlocked position (not shown) at which the locking portions 87 disengage (escape) downwardly from the corresponding lock grooves 28.

In this case, as shown in FIG. 19, point A becomes the action position between the lock lever 85 and the elastically-deformable portion 98, and point B is at the position of the supported portions 88. Furthermore, also in this case, L1, L2, L3 and L4 are set so that F1 becomes smaller than F2.

INDUSTRIAL APPLICABILITY

In the slide rail device for a vehicle according to the present invention, even in the case where the rotatable range of the lock operational lever is limited to a narrow range by the upper rail, the rotatable range of the handle that is connected to the lock operational lever can be enlarged, and furthermore, the operational force necessary to carry out a lock release operation can be made small.

REFERENCE SIGNS LIST

10 Slide rail device
15 Mounting bracket
20 20" Rail unit
21 Lower rail
22 Bottom wall
23 Outer wall portion
24 Roof underside portion
25 Inner wall portion (vertical wall)
26 Base-end supporting portion
27 Lock teeth (lock mechanism)
28 Lock grooves (lock mechanism)
30 Upper rail
31 Base
32 Upright walls
33 Locking walls
34 Forward/rearward movement restriction grooves
35 Restriction piece
36 37 Lock-engaging lug
38 Lower support portion
40 Lock release lever (lock operational lever)
42 Side walls
43 Rotational contact protrusion
44 Spring pressing-piece
44 Spring-hook groove
45 Roof hole 46 Upper supporting portion
47 Spring-hook recess
48 Underside supporting pieces
50 Lock spring (lock biaser)
51 Locking portions (lock mechanism)
52 Front-end locking lugs
53 Rear-end lock-engaging portion
55 Retainers
56 Bearing balls
60 Loop handle (handle)
61 Operation portion
62 Rear-end connecting portion
63 Upper contacting surface
64 Lower contacting surface
65 Upper supported portion
66 Lower supported portion
67 Lock-engaging groove
70 Biasing spring (biaser)
71 Base-surface supporting portion
72 Upper-surface pressing piece
73 Insertion end
74 Handle pressing portion
75 Downward-facing lock-engagement pieces
76 Base-surface pressing piece
77 Side arm
78 Upward-facing lock-engagement pieces
85 Lock lever (lock operational lever)
86 Horizontal lock-plates
87 Locking portions (lock mechanism)
88 Supported portions
90 Rotational support members
91 V-groove (supporting groove)
92 Supporting surfaces
94 Front biasing spring (lock biaser)
95 Rear-end lock-engaging lugs
96 Rear biasing spring (lock biaser)
97 Base part
98 Elastically-deformable portion
P Contact portion

The invention claimed is:

1. A slide rail device for a vehicle comprising:
a lower rail which extends in a forward/rearward direction and is immovable relative to a floor of the vehicle;
an upper rail which supports a seat and is supported by said lower rail to be slidable in said forward/rearward direction;
a lower support portion provided on said upper rail, wherein said lower support portion extends inwardly from a side wall of said upper rail;
a lock mechanism, provided between said upper rail and said lower rail, which restricts or releases restriction of sliding of said upper rail;
a lock operational lever provided in an internal space of said upper rail, a portion of said lock operational lever which is rearward from said lower support portion being rotatably supported by said upper rail, and said lock operational lever being upwardly/downwardly rotatable between a locked position, at which the sliding restriction is allowed by the lock mechanism, and an unlocked position, at which a front portion of said lock operational lever moves further upward than said locked position to release said sliding restriction;
an upper supporting portion provided on said lock operational lever, said upper supporting portion positioned further forward than said lower support portion and further upward than said lower support portion;
a handle provided with a lower supported portion on an underside thereof which is rotatably supported by said lower support portion, and an upper supported portion on an upper side thereof which is positioned further forward than said lower supported portion and is rotatably supported by said upper supporting portion, said handle projecting forwardly from said lock operational lever;
said handle and said lock operational lever are arranged to relatively rotate upward with each other when said lock operational lever is moved to said unlocked postion and said lower supported portion rotates while being supported at said lower support portion; and
a biaser which rotatably biases said handle with respect to said lock operational lever in a direction so as to constantly maintain a supported state of said lower supported portion by said lower support portion and a supported state of said upper supported portion by said upper supporting portion.

2. The slide rail device for a vehicle according to claim 1, wherein said lock mechanism comprises a lock biaser which biases said lock operational lever toward said locked position, wherein L1, L2, L3 and L4 are set so that:
$F1=F \times L1/L2 \times L3/L4 < F2=F \times L1/(L2+L4)$, wherein, when said lock operational lever is positioned at said locked position, L1 designates the distance in the forward/rearward direction from the action position between said lock operational lever and said lock biaser to the rotational center position of said lock operational lever; L2 designates the distance in the forward/rearward direction from said rotational center position to said upper supporting portion; L3 designates the distance in the forward/rearward direction from said upper supporting portion to said lower support portion; L4 designates the distance in the forward/rearward direction from said upper supporting portion to an operation portion of said handle; and F designates a force which said lock operational lever applies on said lock mechanism, when said sliding restriction by said lock mechanism is released by said lock operational lever.

3. The slide rail device for a vehicle according to claim 1, wherein said lock operational lever is rotatably biased toward said locked position, and
wherein, when said lock operational lever is positioned at said locked position, said lower support portion and said upper supporting portion maintain a relative rotational position of said handle with respect to said lock operational lever at a predetermined position.

4. The slide rail device for a vehicle according to claim 1, wherein said biaser further comprises a base-surface supporting portion which is in contact with said lower support portion and said lower supported portion.

5. The slide rail device of a vehicle according to claim 1, wherein said handle is configured to have an upward rotational angle greater than an upward rotational angle of said lock operational lever.

* * * * *